United States Patent [19]

Hon

[11] Patent Number: 4,907,973
[45] Date of Patent: Mar. 13, 1990

[54] EXPERT SYSTEM SIMULATOR FOR MODELING REALISTIC INTERNAL ENVIRONMENTS AND PERFORMANCE

[76] Inventor: David C. Hon, 1450 Northwest Woodbine Way, Seattle, Wash. 98103

[21] Appl. No.: 270,012

[22] Filed: Nov. 14, 1988

[51] Int. Cl.⁴ .............................................. G09B 23/28
[52] U.S. Cl. .................................. 434/262; 434/267; 434/272; 434/307
[58] Field of Search ............... 434/262, 267, 272, 307, 434/265; 128/8

[56] References Cited

U.S. PATENT DOCUMENTS 4,360,345 11/1982 Hon ..................................... 434/307
4,726,772 2/1988 Amplatz ............................. 434/272

FOREIGN PATENT DOCUMENTS 2592514 of 1987 France ................................. 434/262

Primary Examiner—Edward M. Coven
Assistant Examiner—Valerie A. Szczepanik
Attorney, Agent, or Firm—Gerald G. Crutsinger; John F. Booth; James O. Dixon

[57] ABSTRACT

A medical investigative system in which a person interacts with the system to interject information that is utilized by the system to establish non-restricted environmental modeling of the realities of surrogate conditions to be encountered with invasive or semi-invasive procedures. This is accomplished by video display of simulated internal conditions that appear life-like, as well as by display of monitor data including, for example, blood pressure, respiration, heart beat rate and the like.

42 Claims, 12 Drawing Sheets

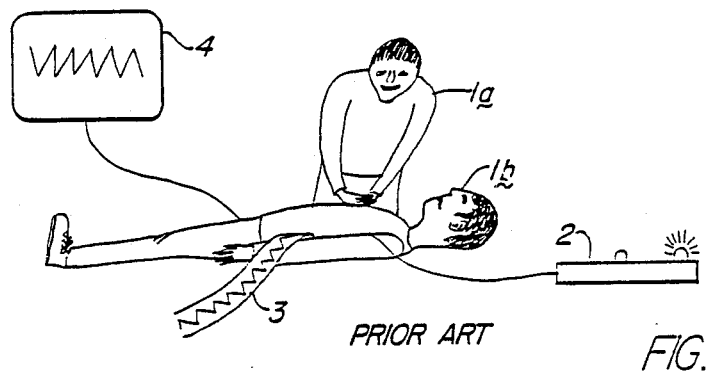
PRIOR ART     FIG. 1
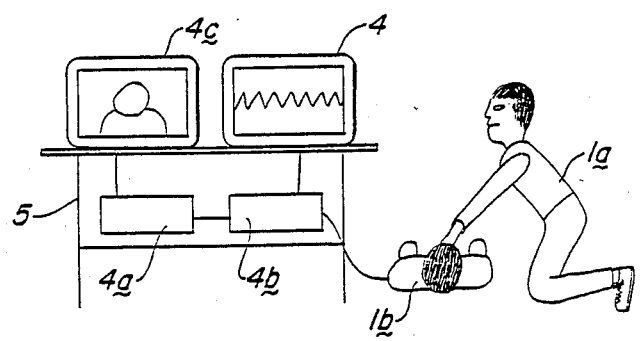
PRIOR ART     FIG. 2
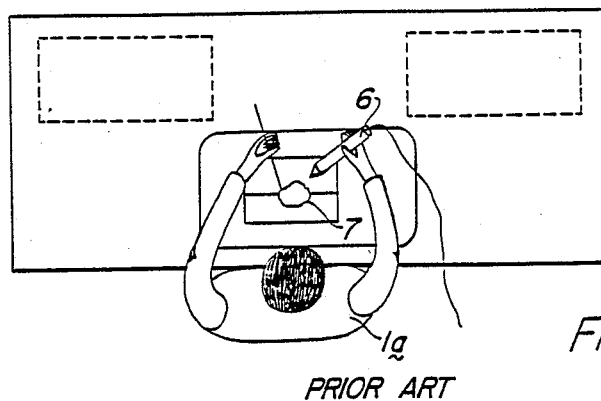
FIG. 3
PRIOR ART

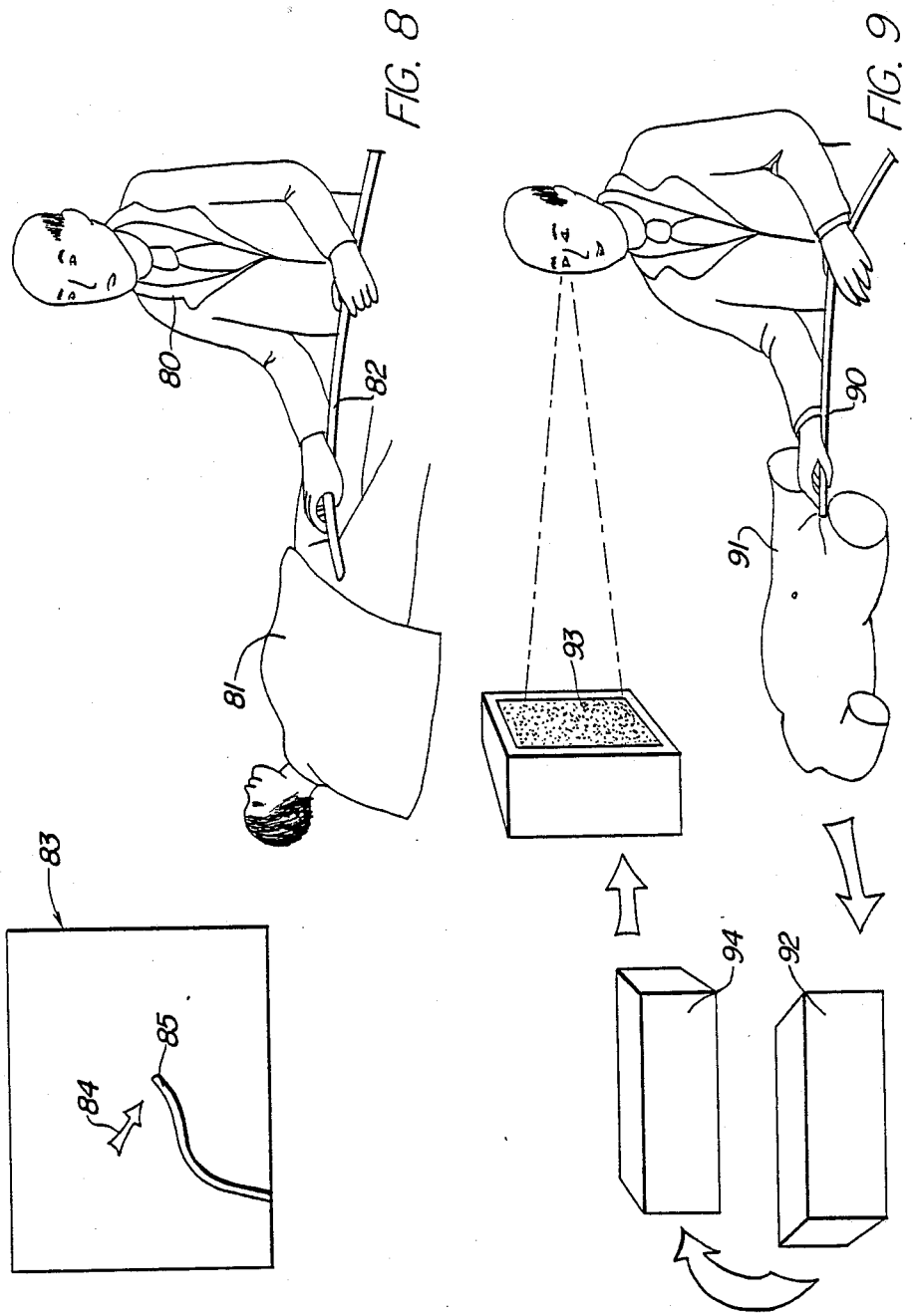

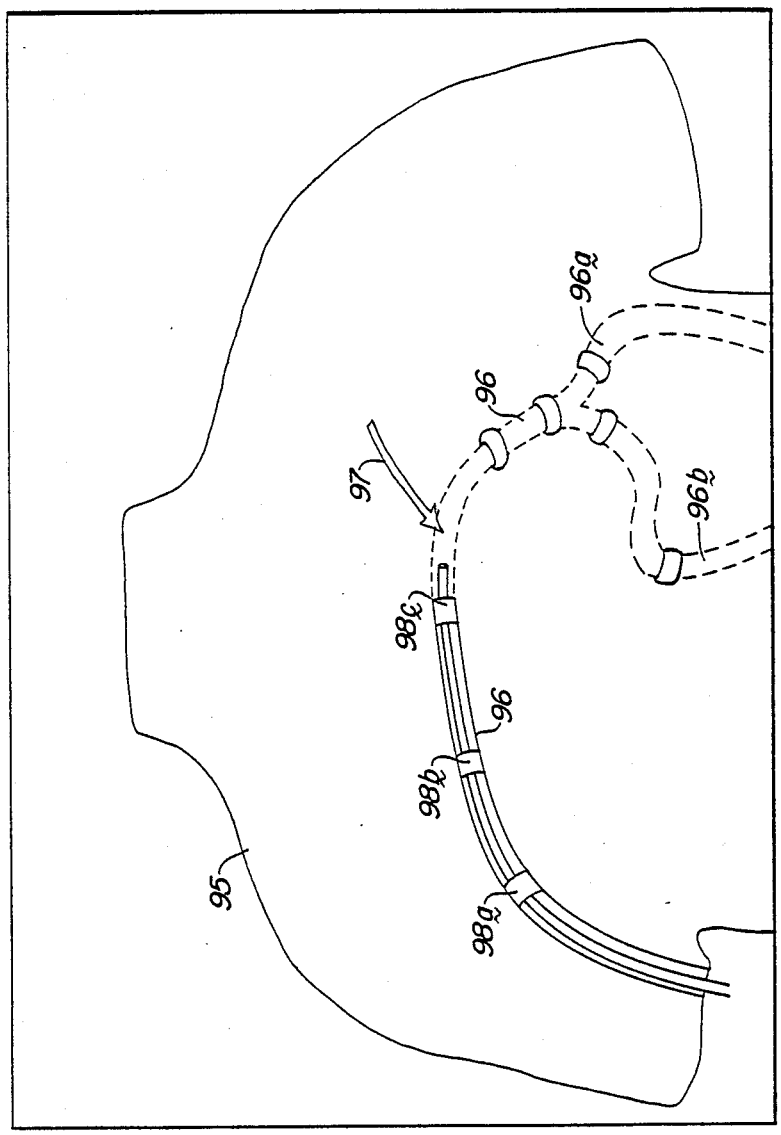

SAMPLE CRITIQUE PRINT-OUT:
DIAGNOSIS TIME 15 MINUTES
NO PERFORATIONS
ESOPHAGUS INSPECTION - ADEQUATE
DUODENUM INSPECTION - ADEQUATE
STOMACH W/DRAWAL INSPECT- INADEQUATE

1. UPPER ATRIUM QUADRANTS NOT INSPECTED BY RETROFLEX
2. FUNDIS NOT INSPECTED
3. VARISES IN FUNDIS NOT PROBED.

FIG. 14a

EXPERT SYSTEM SIMULATOR FOR MODELING REALISTIC INTERNAL ENVIRONMENTS AND PERFORMANCE

BACKGROUND OF THE INVENTION

This invention relates to an expert system simulator for modeling that is especially useful for training personnel in the medical and related arts. More particularly, the invention pertains to such a system or systems in which a person interacts with the system to interject information that is utilized by the system to establish extremely realistic simulations of the "look and feel" of certain surgical and therapeutic procedures which may be prescribed by physicians and surgeons for certain patients.

In the past, exploratory surgery was often performed merely to determine the pathology that created otherwise unexplained symptoms, but such surgery exposed patients to complications of trauma and infection that were entirely unrelated to the original complaint. Accordingly, ways have been sought to better determine medical conditions and treat them effectively without resorting to invasive diagnostics.

Modern medicine has given rise to an increasing number of highly sophisticated non-invasive and semi-invasive procedures that are performed on patients for diagnostic, therapeutic and microsurgical purposes. Such procedures are often performed in a very brief period of time on patients who either may not require or be capable of being fully anaesthesized or hospitalized. For many of these techniques and procedures such as arthroscopic surgery, therapeutic endoscopy and coronary angioplasty, for example, it has seemed that the only way for a practitioner to master the necessary skills and required techniques was through experience on live subjects.

Live patients have seemed essential in practicing semi-invasive methods because the normal pressures in arteries or tracts and other vital functions, are necessary to the passage of instruments and the reaction of the living organs. Moreover, it is essential that there be relevant patient responses which are important, if not crucial elements of successful procedures. Accordingly, there has been a tendency for the already experienced physicians to be asked to perform whatever operations or procedure that are necessary, and it has been difficult for inexperienced physicians to obtain a desired level of competence. Moreover, even where a physician has performed a given procedure from time to time, there is the need to maintain a high degree of skill that is possible only through recent experience. Accordingly, there has continued to be a need for a substitute way of providing real-life experience on a current basis without the necessity for obtaining that experience on living persons.

Proposals have been made to simulate living conditions in non-living substitutes, illustrative of which are the proposals made in U.S. Pat. No. 4,360,345 granted Nov. 23, 1982 to David Hon. According to the proposals of that patent, there is provided a computer-controlled interactive instruction system for teaching an individual how to administer cardiopulmonary resuscitation. However, laudatory as those proposals may have been, they were structured toward comparing a technique being administered to a dummy with standard indicia stored in the computer memory and did not propose operator defined surrogate invasive travel within the subject. Moreover, since they were structured to specific performances and external responses, they did not provide for complete and non-restricted environmental modeling of potentially encounterable conditions, nor did they contemplate the internal realities of surrogate conditions. In other words, the proposals of the prior art were concerned with highly structured instructional procedures in which external indicia were compared with standard indicia and the results displayed to the student. Accordingly, there continued to be a need for simulation that is life-like and that provides a full range of indicia that may be encountered when performing surgical procedures on living persons.

BRIEF SUMMARY OF THE INVENTION

In contrast with the proposals of the prior art, the instant invention provides non-restricted environmental modeling of the realities of surrogate conditions to be encountered with invasive or semi-invasive procedures. This is accomplished by video display of simulated internal conditions that appear life-like, as well as by display of monitor data including, for example, blood pressure, respiration, heart beat rate and the like.

The information from which the system develops the surrogate display is taken from actually encountered sensing of conditions existing in actual procedures. Such information may be derived from video imaging, angiograms, magnetic resonance images, digitized x-rays and other visualizing methods that are presently or may in the future become available for observing and storing information from which pictorial representations may be produced for display on video or similar displays.

In accordance with the invention, there are four particular aspects that characterize the instant innovations:

OBJECTS AND FEATURES

It is one general object of the invention to improve the learning and practicing of invasive and semi-invasive surgical procedures.

It is another object of the invention to provide a real time interactive relationship between surgical conditions and the physician or other user.

It is still another object of the invention to provide realistic advance modeling for surgical procedures.

It is still another object of the invention to provide an improved record of an actual procedure for subsequent critique, learning and other purposes.

It is yet another object of the invention to provide an improved mechanism for recording an input-authored modality.

It is one additional object of the invention to provide a convenient means for collecting and analyzing use performances and to appropriately condition an artificially intelligent expert system.

Accordingly, in accordance with one feature of the invention, a physical model is provided to represent physically and spacially, at least that portion of a patient on which a selected procedure is to be performed, thereby providing a high degree of realism in performing the selected procedure.

In accordance with another feature of the invention, at least one implement representing the principal procedural tool normally employed for practicing the selected procedure is provided for operator manipulation, thereby adding to a faithful quality to operator experience.

In accordance with yet another feature of the invention, manipulative means for providing a full range of manipulation of the procedural tool is included, thereby adding to the versatility and adaptability of the system.

In accordance with still another feature of the invention, a scope modality form of display is provided, thereby contributing to the life-like quality of operator experience and facilitating interaction between the operator and the system.

In accordance with yet another feature of the invention, storage is provided to store and retrieve data for producing manipulable surrogate realities of internal landscapes, thereby contributing additionally to the reality of operator experience.

In accordance with still another feature of the invention, the physical model is equipped with spaced sensors, constrictors and other physical characteristics-imparting elements thereby to impart to said model highly realistic qualities.

In accordance with yet another feature of the invention, provision is made for comparison of techniques and other procedure performance characteristics with authoritative optimal techniques and characteristics to produce displayed and printed critiques.

In accordance with one additional feature of the and permanent and temporary storage means are included to provide for temporary or permanent storage of procedure results in order to provide an ongoing record.

These and other objects and features of the invention will be apparent from the following detailed description, by way of preferred embodiments, with reference to the drawing.

BRIEF DESCRIPTION OF THE DRAWINGS

FIG. 1 illustrates one expression of the prior art wherein a manikin with sensors inside responds to user performance with lights, a paper tape, or computer screen.

FIG. 2 illustrates another expression of the prior art in which procedures are performed on a human subject and in which one or more video discs provides training.

FIG. 3 is yet another illustration of typical prior art wherein in an oxyacetylene welding simulator, a light pen serves as a mock torch and gathers light from the video screen, modifying the screen image coming from a videodisc in accordance with the position of the light pen/torch in relation to the screen.

FIG. 8 is a drawing showing the normal relation between the cardiologist, patient, and frequency picture and data monitors in a balloon-angioplasty operation to free occlusions in major arteries.

FIG. 9 is a view portraying the current invention in the frequency picture modality, using devices to replicate portions of realistic performance which create a realistic data and computer graphic environment for experience rather than an evaluation platform for skills transfer.

FIG. 10 is drawing depicting one possible internal model for the purposes of realistic simulation of both the look and feel of the surgery.

FIG. 14a depicts a representative system monitor screen display.

DETAILED DESCRIPTION OF INVENTION

Figure 4:
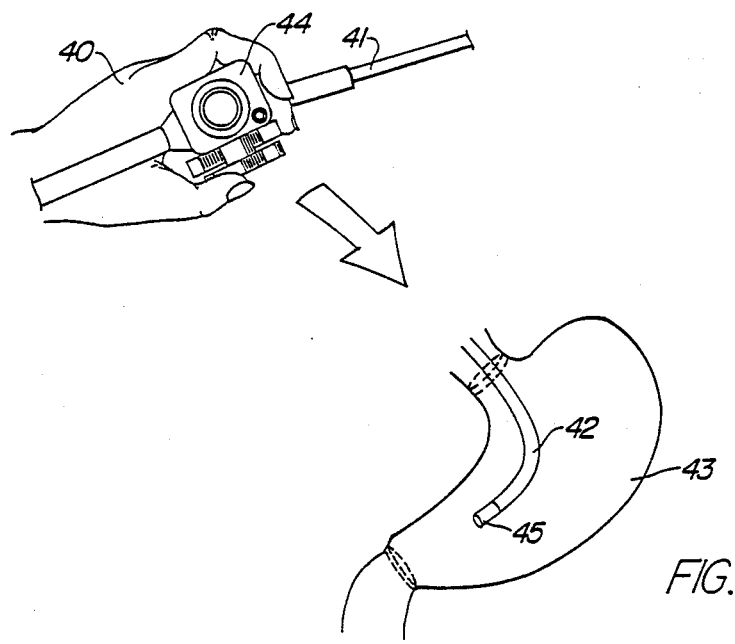
FIG. 4 illustrates the normal relation between endoscope and digestive tract which, in normal operation, allows the medical professional to see by scope modality the internal landscape of the digestive tract.

Now turning to the drawing (in which like numerals identify like parts throughout) and more particularly FIG. 1 thereof, it will be observed that it depicts teaching apparatus according to the prior art. Manikin 1b is employed as a teaching tool and is equipped with sensors (not shown) that respond to manipulation of the manikin by a pupil 1a by activating lights 2, a paper tape printout 3 or a monitor (e.g., computer monitor) 4. FIG. 2 illustrates a more sophisticated embodiment of the prior art according to which the pupil 1a is manipulating a real live subject 1b that is lying prostrate on the floor or other suitable supporting medium (not shown). Conventional sensors (not shown) are attached to appropriate parts of the subject's anatomy and develop signals that are fed to video discs 4a and 4b in console 5 where they activate displays 4 and 4c.

FIG. 3 is another example of the prior art illustrated by an oxyacetylene welding simulator in which a light pen 6 serves as a mock torch and gathers light from the video screen 7, modifying the screen image coming from a videodisc (not shown) in accordance with the position of the light pen/torch in relation to the screen. As will be evident to those skilled in the art, there are many other examples in the prior art of manipulative systems in which the condition of a manipulated object is sensed and in which the output of the sensors is displayed or otherwise made evident to the manipulator.

In contrast with the foregoing, the principles of the present invention are illustrated in the following preferred embodiments set forth in FIGS. 4–16. As mentioned above, in these embodiments, the virtually seamless flow of internal landscapes simulates a viewed reality; input-authoring modality allows a physician or other type user to input known current case factors into this internal landscape and thereby into an expert system data base; performance data is collected on the use and analysis by an artificially intelligent expert system; and pre-operational simulation performance is presented in light of surrogate realities as a tool in medical and other professional practice for both modeling an operation prior to its occurrence and documenting for legal and other purposes, the performance of a user or a team of users against that model and such variety of expert opinions which reside in the expert system data base.

In FIG. 4, surrogate pattern positionality is determined by computer, and the expert system provides situational modeling and analysis by a variety of the expert process. FIG. 4 shows the hand 40 holding conventional endoscope control 41 extended through extensions 41 and 42 into a real or simulated patient. Endoscope control 41 is manipulated with one hand, while the other hand snakes the endoscope into a fully conscious patient. When inserted in the upper gastrointestinal tract, the viewing angle of the endoscope can be manipulated and the lens can be washed using conventional techniques, and a suction pump may be activated. As seen from reference to the drawing, FIG. 4 shows the endoscope tip 45 in one of many possible viewing positions in the stomach 43 of a real or simulated patient.

Figure 5:
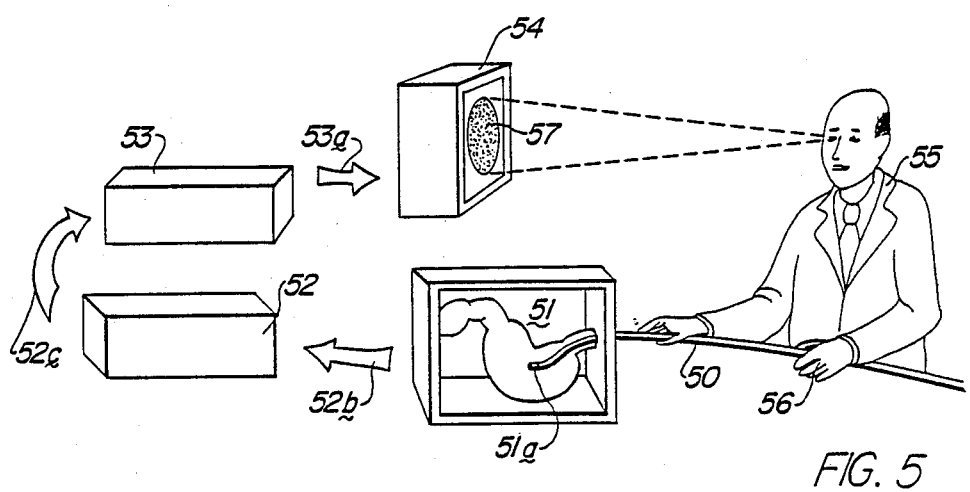
FIG. 5 portrays the current invention in the scope modality, using devices to replicate portions of realistic performance which create a realistic video environment for experience rather than an evaluation platform for skills transfer.

FIG. 5 portrays one embodiment of the present invention in which a mock endoscope 50 is inserted within model 51 by operator 55. Within model 51 there are a plurality of sensors (not shown) that respond to the position of the tip 51a of the endoscope 50 and which transmit corresponding signals via conventional transmission linkages 52b to computer 52. Computer 52 responds thereto by accessing storage 53 via conventional transmission linkage 52c to retrieve from conventional storage 53 a plurality of electrical indicia representing the view which would observed from the relative location of the tip 51a during a real operation. Such indicia are conducted to video display 54 by conventional connections represented by arrow 53a.

As is known to those skilled in the art, currently available rapid-access storage media are capable of handling hundreds of megabytes of information and can easily store the large quantity of data required to provide the images required to simulate real investigative or surgical procedures. Accordingly, storage 53 may be any one of several suitable alternative storage media. According to the preferred embodiment, a high capability optical disc (such as a video disc) drive is employed for this purpose.

Since movement of the tip 51a is sensed by the aforementioned sensors, movement thereof results in a corresponding change in the image shown on the screen 57 of video display device 54. Thus, a complete cycle is developed from hand-action 56 to resultant image 57 to new hand-action to another essentially instantly changed image, with computer 52 translating each variation in the mock endoscope to the precise image which would be viewed in a real operation. Accordingly, as mentioned above, one important feature of the invention is that it reacts visually for the user as the image from an endoscope would if coming from inside a patient, and the internal landscape that has been created will be virtually indistinguishable from the inside anatomy of a real patient as viewed through an endoscope. This provides the medical professional the opportunity to pratice manipulation and diagnosis. It also allows the computer to collect information as related to an expert system since the computer, according to the inventive concepts hereof, observes the performance of a medical professional and records the same in memory. Such record can have extensive implications not only in terms of testing the capabilities of a physician for such purposes as certification, but additionally can provide a valuable record of performance useful for many purposes, e.g., legal liability.

Figure 6:
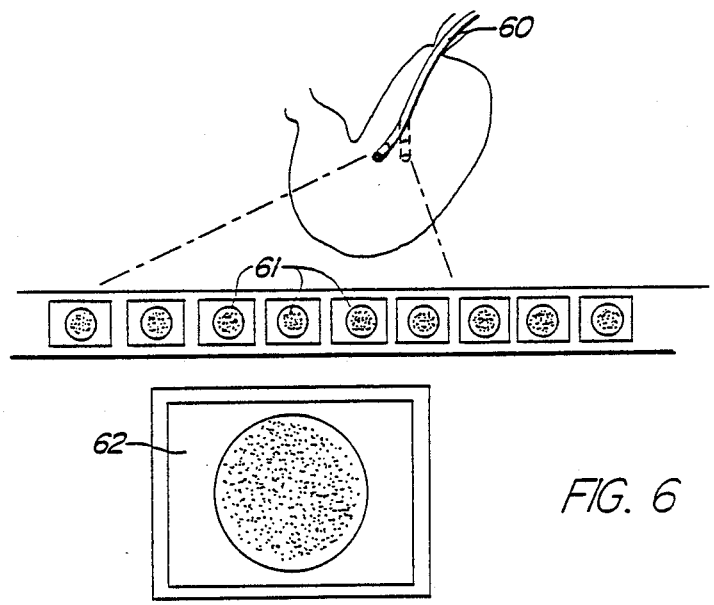
FIG. 6 is a drawing portraying ordinarily seen views segmented into 1/30 second frames for construction of a manipulable surrogate reality of the internal landscape.

FIG. 6 depicts views displayed by the video monitor as segmented into 1/30th second frames that are compatible with conventional video displays. As mentioned above, the views displayed on the monitor are a manipulable surrogate reality of the internal landscape. The mock endoscope 60 through its own internal sensors and, where mock samples are employed, through sensors disposed about the interior of the mock sample, registers its angles and movements to the computer which obtains data from memory to create the appropriate frame(s) 61. The frames are then displayed on the video display to display realistic movement across the internal landscape. As mentioned above, the medical professional 55 (FIG. 5) is thus able visually to observe a realistic representation of the internal landscape and conduct further procedures appropriately.

To allow for variation of movement, the visual data base in memory 53 (FIG. 5) is adapted to store information that reflects both linear motion (as may be recorded by a film or videotape recording of an operation) and all sequences that may be seen by an actual endoscope when located at that position in the digestive tract. Accordingly, a feature of the present invention is that it provides for the collection, processing and storage of visual data in precise reaction to the data input by sensors from the mock endoscope.

FIGS. 7a-7e portray representative angles of view and search which are replicated in their effect by structuring and storing data in memory 53 (FIG. 5). Since an actual endoscope provides full 360 degree horizontal scanning as well as much vertical scanning as anatomy permits, the required memory storage capacity is very large. However, as mentioned above, state-of-the-art storage components, such as video discs, are adequate to meet these needs.

Figure 7A:
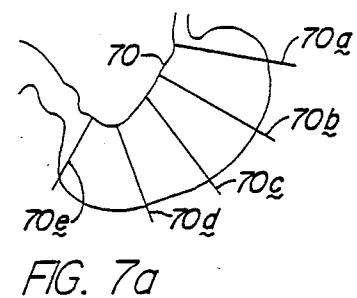
FIGS. 7a, 7b, 7c, 7d and 7e are drawings portraying the potential angles of view and search which must be replicated in their effect by structuring of all possibilities in the internal landscape.

FIG. 7a depicts a stomach 70 onto which there have been superimposed lines which represent arbitrary sections that are identified in computer memory for purpose of analysis and recall. The precise locations of these representational lines is conditioned upon the characteristics of the memory and other components of the organizational, storing and retrieval systems selected by the programmer in structuring the computational system. Data for each section (the area bounded adjacent ones of lines 70a-70e) are recorded and are identified by sector and location within the sector so as to provide for ready identification, storage and recall.

Figure 7B:
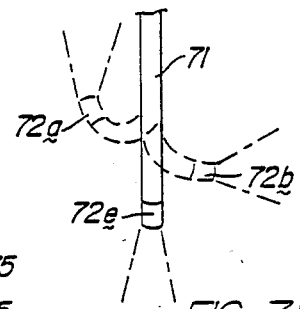

FIG. 7b depicts the 360 degree capability of the endoscope 71, with position of scanning terminus 72 being shown in reverse scan at 72a, is ninety degree side scan at 72b, and in direct scan at 72e.

Figure 7C:
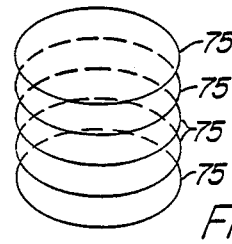
Figure 7D:
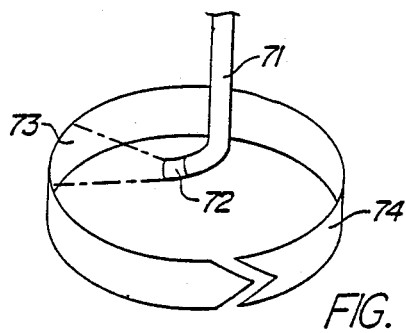
Figure 7E:
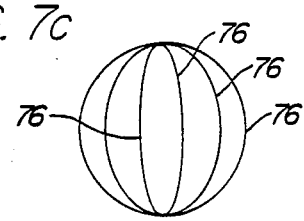

FIG. 7d illustrates the 360 degree rotational scan feature of the endoscope 71, with scanning terminus 72 being directed essentially at a ninety degree side position to scanning region 73. As illustrated by the figure, the endoscope may be retained at the ninety degree position (as shown) and rotated 360 degrees circularly as represented by horizontal circular scanning arc 74. Of course, the endoscope may be oriented upwardly or downwardly as the operator chooses, and the head may be swept along any path within a mythical sphere, thus affording complete maneuverability to the operator. FIGS. 7c and 7e illustrate this versatility by circular horizontal scanning paths 75 and elliptical paths 76 respectively.

FIG. 8 illustrates a typical relation between a cardiologist 80, a patient 81, a catheter 82 and visual display 83 in a balloon-angioplasty operation to free occlusions in major arteries. In the display, the arrow 84 is pointing to the representation of the moving terminus 85 of the catheter.

As is known to those skilled in the art, in the coronary procedure, the cardiologist manipulates the balloon catheter from the entry to the femoral artery in the groin, through the arterial system up into the heart, and finally through the lesion in the plaque that occludes the artery. When the lesion is passed, the balloon surrounding the catheter is inflated, and plaque is opened to permit less restricted blood flow. The difficulty and danger of this procedure obviously mitigates against its being learned on live patients. Accordingly, as mentioned above, the present invention offers an invaluable opportunity to learn such difficult surgical techniques in a realistic setting, without incurring attendant risks associated with experimenting or learning on a live patient.

FIG. 9 portrays the present invention in the frequency picture modality, using mock catheter 90 and an internal arterial modeling device 91 to replicate selected portions of realistic performance. (By "frequency picture" is meant a display generated by non-video sensors such as those responsive to infra-red, ultrasonic, magnetic resonance or X-ray stimuli.) As mentioned above, the computer (92) receives data from internal sensors from which to call for and retrieve selected data from storage (94), process same and then send processed data to display 93 where it provides a visual display simulating a realistic environment for current experience rather than, as with the prior art, a mere evaluation platform for skills transfer.

The memory within high capacity memory bank 94 may principally be high capacity read-only memory or the like, or it may be dynamic memory in applications in which it is desired to have the flexibility to change the simulated environment to match recent experience.

Although the display may be a conventional or high resolution cathode ray tube, it may be of any type capable of producing a frequency picture display simulation in order to provide a greater degree of facility for computer graphics and other desirable features. The precise type of the display is not an essential part of this invention for an type of reasonable resolution computer controlled display can be employed without departing from the spirit and scope of the inventive concepts hereof.

FIG. 10 illustrates one representative internal model 95 with mock arterial paths 96, 96a and 96b and mock catheter 97 for realistic simulation of both the depth and feel of angioplasty. Sensors 98a, 98b, 98c . . . 98n track the progress of the inserted catheter 97. Since in an actual operation, a real catheter proceeds almost immediately beyond the vision of the cardiologist who is performing the procedure, the actual pattern of mock arteries in the model is adapted principally for providing a realistic simulation of distance and impedance to progress.

Figure 11B:
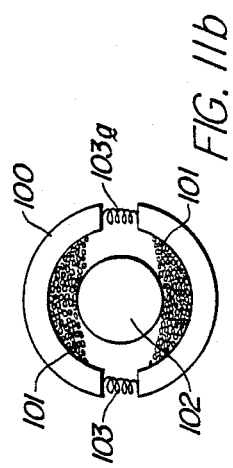
FIGS. 11a and 11b are drawings depicting partial anatomy devices which can reflect the feel and spacial relation of the internal artery path without the necessity of a realistic look to the model; and which can sense the presence, depth and direction of the mock catheter.
Figure 11A:
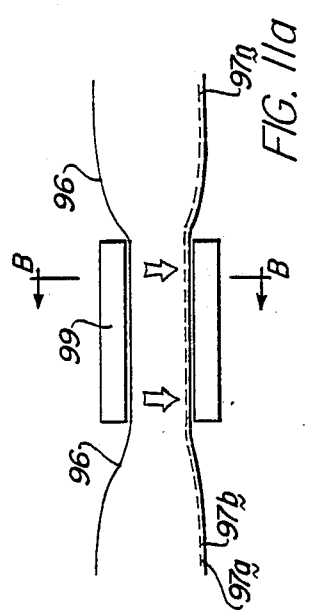

FIG. 11a illustrates partial anatomy devices which reflect the feel and spacial relation of the internal artery path, without the necessity of a realistic look to the model, and which sense the presence, depth and direction of the mock catheter. Within or adjacent to the arterial pathway 96, magnetic ring sensors 97a . . . 97n trace the direction and distance of catheter insertion; and a vessel constricting simulator 99 is positioned in one or more desired locations along mock arterial path 96.

FIG. 11b shows a cross section of vessel constricting simulator 99 of FIG. 11a. Here, the walls of the blood vessel are identified with the numerals 100, the simulation of the lesion constriction is shown at 101, the balloon 102 of the catheter is shown in its partly expanded state, and ratchet mechanism 103 and 103a is provided to simulate the lumen which reforms as a sleeve to assist blood flow.

Figure 12B:
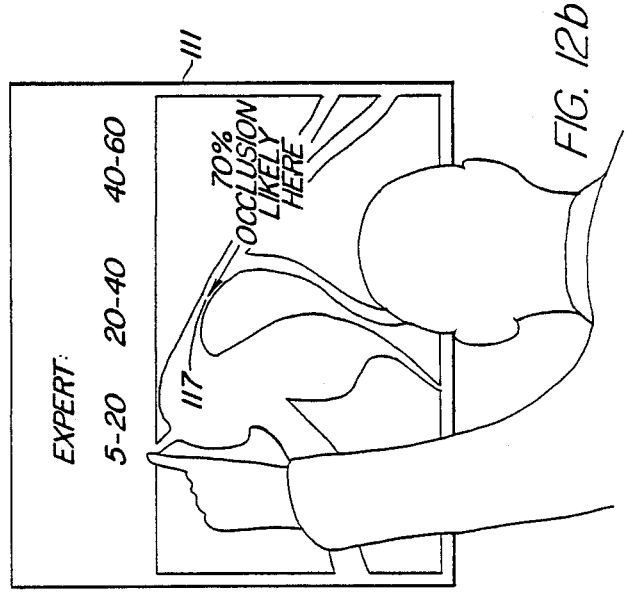
FIGS. 12a and 12b are views illustrating information input and interacting capabilities of the system.
Figure 12A:
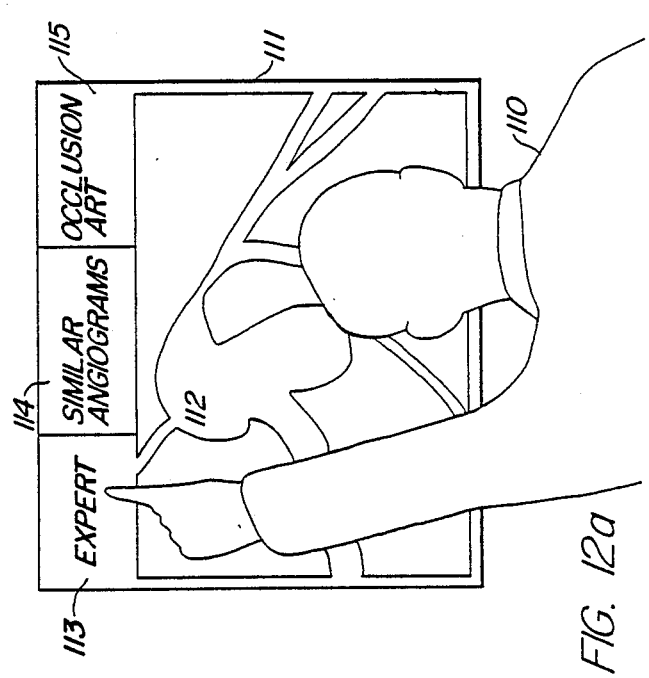

FIGS. 12a and 12b illustrate a preferred form of interaction between an operator and display for the purpose of analysis of a patient's problem. In FIG. 12a, the operator 110 is shown observing a display 111 which depicts the interior landscape 112 from a patient taken during an examination. Across the top of the display are three categories 113 Expert, 114 Similar Angiograms, and 115 Occlusion Art, for selection by the operator. Although these three categories are presented as preferred, it will be evident to those skilled in the art that many other categories could be established and displayed according to the particular tools desired and the particular emphasis desired.

By touching one of the aforementioned three areas on the display screen, the system memory is accessed to provide the needed responsive information which is then displayed on the screen. FIG. 12b illustrates one such display that appears on the screen according to this illustrative example when "Expert" screen area 113 is touched. The display continues to display the basic interior landscape. However, the space at the top of the screen is changed to display information relating to the selected category "Expert." After comparing the data developed from the mock illustrative example, the computer is able to ascertain that there is a 70% likelihood that an occlusion occurs at location 117.

The general principles of the invention and functions of the system having now been described, further understanding may be enhanced by the following description of the logic diagrams and hardware block diagrams of FIGS. 13, 14, 15, 16 and 17.

Figure 13:
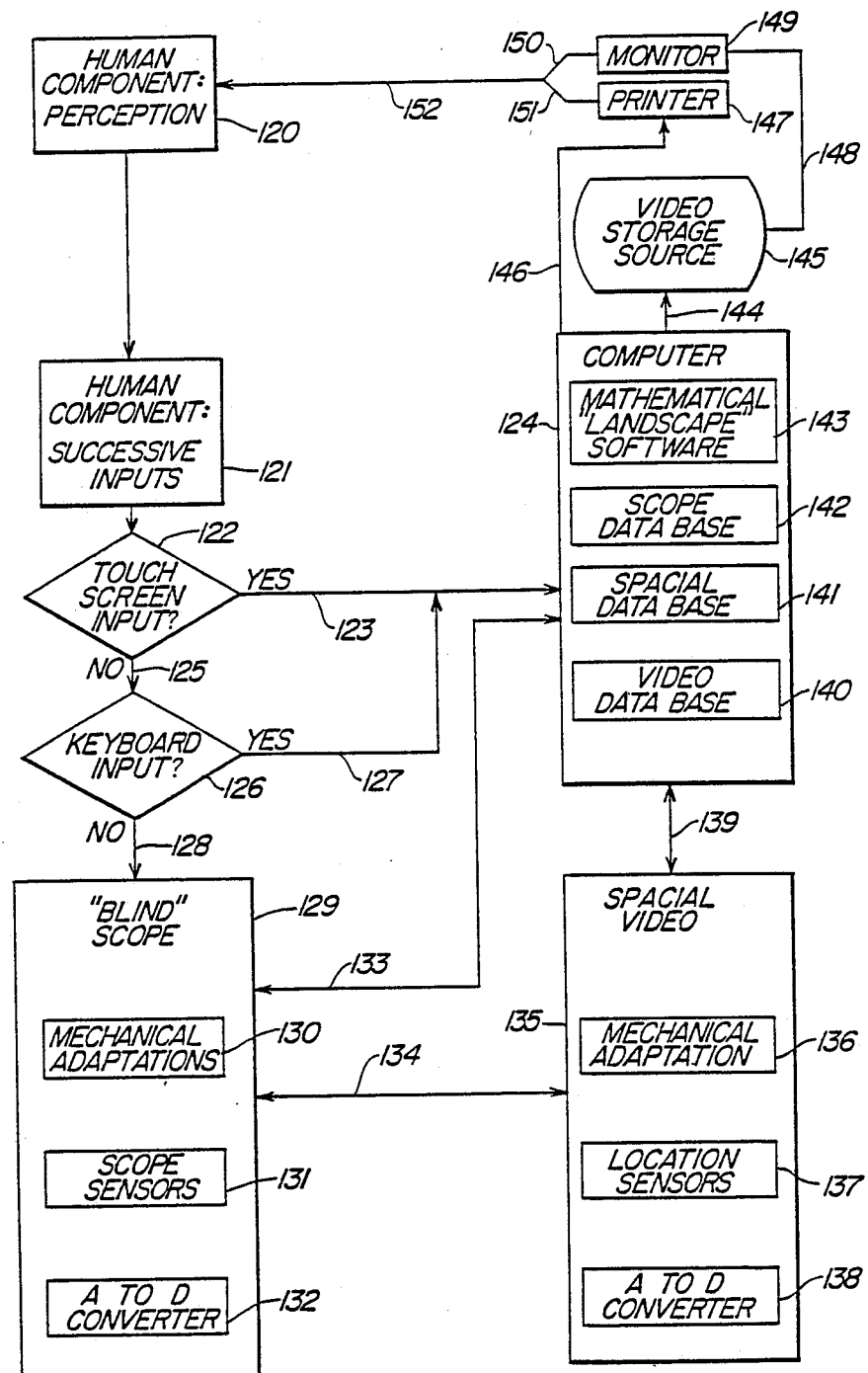
FIGS. 13, 14, 15 and 16 are logic and flow diagrams depicting the system flow and illustrating the real-life and interactive features of the invention.

Now turning to FIG. 13, it will be observed to portray a logic/flow diagram representing one embodiment of the invention. There, it will be observed, is the identified the human component 120, that is, the operator of the equipment who supplies the element of perception. The operator 120 interacts with the equipment to provide successive inputs which are introduced into the equipment by any suitable means known in the art such as screen touch input 122 (previously portrayed in various figures including 12a and 12b). If the input is by screen touch, then path 123 identifies the "yes" step of then accessing computer 124. If the input is not by screen input 122, then path 125 identifies the result, that is, "no", and leads to keyboard input 126.

If input is to be made by keyboard input 126, then the path 127 identifies the "yes" step of then accessing computer 124 from the keyboard. If, in the other hand, input is not to be made by either touch screen input 122 or keyboard input 126, the "no" path 128 identifies the accessing of "Blind Scope" 129 which includes mechanical adaptations 130, scope sensors 131 and an analogue to digital converter 132. Blind scope assembly 129 contains predetermined mechanical adaptations, scope sensors and converters that contain adaptations of the internal landscape that is encountered when performing the type of exploratory examination or surgery that has been selected. It makes such information available via channels 133 and 134 to computer 124 and Spacial Model module 135 respectively. As will be observed, the channels 133 and 134 are bi-directional so as to provide both for interrogation and supply of information.

Spacial Model 135 is in one sense a mirror of Blind Scope 129 in that Model 135 represents information reflecting the model of the internal landscape that would be encountered in performing the type of selected surgery if the operator performs in accordance with accepted techniques. Therefore, the two are interrelated, and such interrelation is communicated therebetween via path 134.

As will be observed from an examination of Spacial Model 135, it includes Mechanical Adaptations on Location Sensors 137 and an Analogue to Digital Converter 138. As will be recalled from reference the heretofore described procedures, the location sensors 137 are either the actual sensors physically located in the model employed in the investigative/surgical procedures or are elements that are responsive to such sensors. As will be known to those skilled in the art, the Analogue to Digital converter 138 is connected to the Location Sensors 137 and Mechanical Adaptations 136 to translate analogue signals received from the Sensors 137 and Adaptations 136 and produce corresponding digital signals which are compatible with Computer 124. Such digital signals are interchanged with computer 124 over data transmission path 139.

Now turning to Computer 124, it will be observed to include Video Data Base 140, Spacial Data Base 141, Scope Data Base 142, a conventional central processor (not shown) and Mathematical Landscape Software 143 with which the central processor processes the Landscape and other behavioral data. Each of these sub-portions of Computer 124 is interconnected via internal interconnections in accordance with well-known computational techniques.

The outputs of Computer 124 are at least three: the first is via path 144 to Video Storage Source 145, the second is via path 146 to Printer 147, and the third is via path 148 to Monitor 149. The Video Storage Source 145 is provided for the purpose of recording the video output from the computer in order to preserve the record of the investigative/surgical procedure as mentioned above, the Printer 147 may optionally be activated to provide a printed record of such data as may be desired, and the Monitor 149 is provided to produce a continuing visual display. Paths 150, 151 and 152 are shown to represent the feedback to the operator of printed data and visual representation presented by the monitor.

Figure 14:
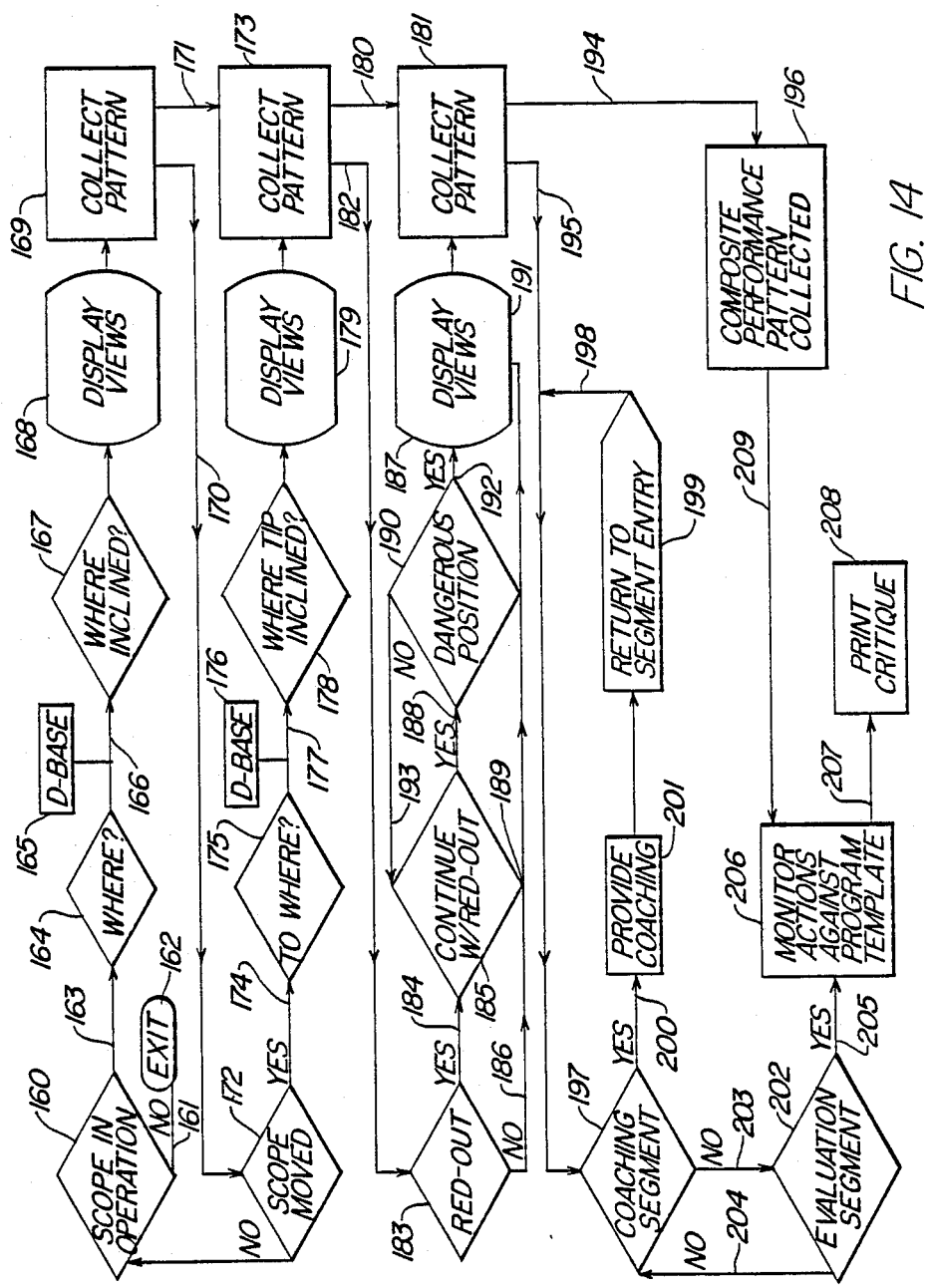

FIG. 14 portrays the flow of information for the operation of the scope during a typical investigative procedure reflecting the principles of the invention. There, the information flow begins with sensing of whether or not the scope is in operative condition. This is represented by diamond 160. As indicated, if the Scope is not in operation or if it is desired to de-activate it, such information is conducted over path 161 to Exit 162. Operation of Exit command 162 sets the equipment in condition for de-activation and, after achieving such condition, completes the de-activation by either removing electric power from system components or by otherwise setting them to their quiescent state.

If the Scope is in operation and it is desired to operate the system, such information is conducted via path 163 to identify the location and other parameters. This is represented by "Where" quadrilateral 164 from which communication is established as needed by reference to the appropriate Data Base 165 (shown and described in connection with the previous figures) via path 166 and to identify additional information represented by "Where Inclined" diamond 167. Such additional information is educed from the aforementioned sensors located in the model, together with the sensor(s) positioned within the instrument being used for investigative purpose, e.g., a mock catheter. After such education, the system produces a relevant display which is represented by "Display Views" block 168. At the same time, data representing the viewed display is introduced to system memory (also as described above) and is appropriately collected and recorded as represented by "Collect Pattern" rectangle 169.

Collect Pattern information is coordinated with other system flow operations as is represented by paths 170 and 171. As shown, path 170 interconnects "Collect Pattern" information with "Scope Moved" diamond 172; and path 171 represents communication of "Collect Pattern" information with a corresponding "Collect Pattern" activity represented by rectangle 173. If the scope has been moved, such an indication t communicated via yes path 174 to the "To Where" diamond 175. On the other hand, if the answer is "No", then such an indication is communicated with "Scope in Operation" diamond 160 whence it may subsequently establish a condition requisite to exit from the system via paths 161 and 162 as described above.

Now returning to path 174, it will be observed that activation of the "To Where" function results in a corresponding action by the equipment described above. Thus, the circuits interrogate the aforementioned sensors to ascertain the answer "To Where Has the Scope Been Moved." To achieve this, the circuits refer to the data base 176 via path 177, and then the system is in condition to proceed with answering the question "Where Tip Inclined" as represented by diamond 178. The system then interrogates the aforementioned sensors to identify the position (e.g., inclination) of the sensors and presents this information to the display views as represented by "Display Views" block 179. As with "Collect Pattern" 169, "Collect Pattern" 173 is in communication with "Display Views" 179 to record the displayed image for temporary or permanent storage as desired.

Emanating from the base of "Collect Pattern" rectangle 173 are two paths which represent interconnections with additional system operations. The first of these, path 180, interconnects with "Collect Pattern" rectangle 181; and the other, path 182, interconnects with "Red-out" diamond 183 which represents the question of whether or not a condition exists wherein the tip of the scope would be pressed directly against a wall of tissue causing the scope to be "blinded" and the screen to produce a red patternless display. If the answer is "Yes", then "Yes" path 184 is conditioned to activate the "Continue With Red-Out" function represented by "Continue With Red-Out diamond 185. On the other hand, if the answer is "No", then additional system activity is represented by "No" path 186 with is connected with "Display Views" block 187. Accordingly, the view is appropriately displayed on the display view monitor described above.

If, after receiving an indication of a Red-Out condition represented by diamond 183, the operator desires to continue the procedure in progress, then he manipulates his hand-operated control to so signify. This is represented by the "Yes" path 188. If, on the other hand, he should wish to discontinue the action that gave rise to the "Red-Out" condition, he correspondingly manipulates his control, and such a "No" response is represented by "No" path which interconnects "Continue w/Red-Out" diamond with "No" path 186. In such event, the "Display Views" 187 are correspondingly actioned.

If a "Yes" response is communicated via path 188, then a potentially dangerous condition is indicated on the system monitor. This is represented by the "Dangerous Position?" diamond 190. The operator then considers the situation and manually inputs the system with and answer of either yes or no. If Yes, then a communication is made with "Display Views" block 191 via "Yes" path 192. If, on the other hand, the answer is no, then such an answer is communicated via "No" path 193 to "Continue W/Red-Out" diamond 185. In either event, "Display Views" block represents that an appropriate image is presented on the system monitor screen so that the operator can visually observe the condition. Also, communication is effected with "Collect Pattern" rectangle 181 to indicate that data illustrative of the condition is either temporarily or permanently recorded.

From "Collect Pattern" 181, further information flow is represented by two paths: one, path 194 represents operative interaction with the system to ensure that performance data is collected and stored. This is illustrated by "Composite Performance Pattern Collected" rectangle 196. The other, path 195, represents operative interaction with "Coaching Segment?" diamond 197 and, by parallel path 198, with "Return to Segment Entry" block 199.

If operation of the system involves coaching, u upon interrogation of "Coaching Segment?" element 197, an affirmative response is conveyed via "Yes" path 200 to the "Provide Coaching" rectangle 201. If, on the other hand, system operation does not involve coaching, then a response is communicated to "Evaluation Segment?" diamond 202 via "No" path 203. In such latter event, the system operator may then input the system to indicate whether or not a segment is to be evaluated. If "No", such an indication is communicated back to "Coaching Segment?" 197 via path 204. If "Yes", then such an indication is communicated forward via "Yes" path 205 to "Monitor Actions Against Program Template" activity 206 where the system actions as produced by the actions of the operator are compared with "the school solution", that is, the idealized actions as stored in the data storage bank for the procedure being conducted. This then permits generation of a procedure critique which is communicated via path 207 to "Print Critique" activity 208 which results in the printing of the critique.

As mentioned above, path 194 represents the operative interaction of "Collect Pattern" activity 181 with "Composite Performance Pattern Collected" activity 196. Information collected by Activity 196 is conducted via path 209 to monitor template 206 in order to provide data needed to produce the aforementioned critique.

FIG. 14a depicts a representative system monitor screen displaying pertinent information relating to a critiqued procedure. As will be observed from reference to the figure, there is displayed an identification of the type of critique (here, a sample critique print-out), the diagnosis time, the findings (e.g., no perforations), an evaluation of the principal components of the procedure (e.g., Esophagus inspection, Duodenum inspection and Stomach Withdrawal inspect), and three other pertinent observations.

Figure 15:
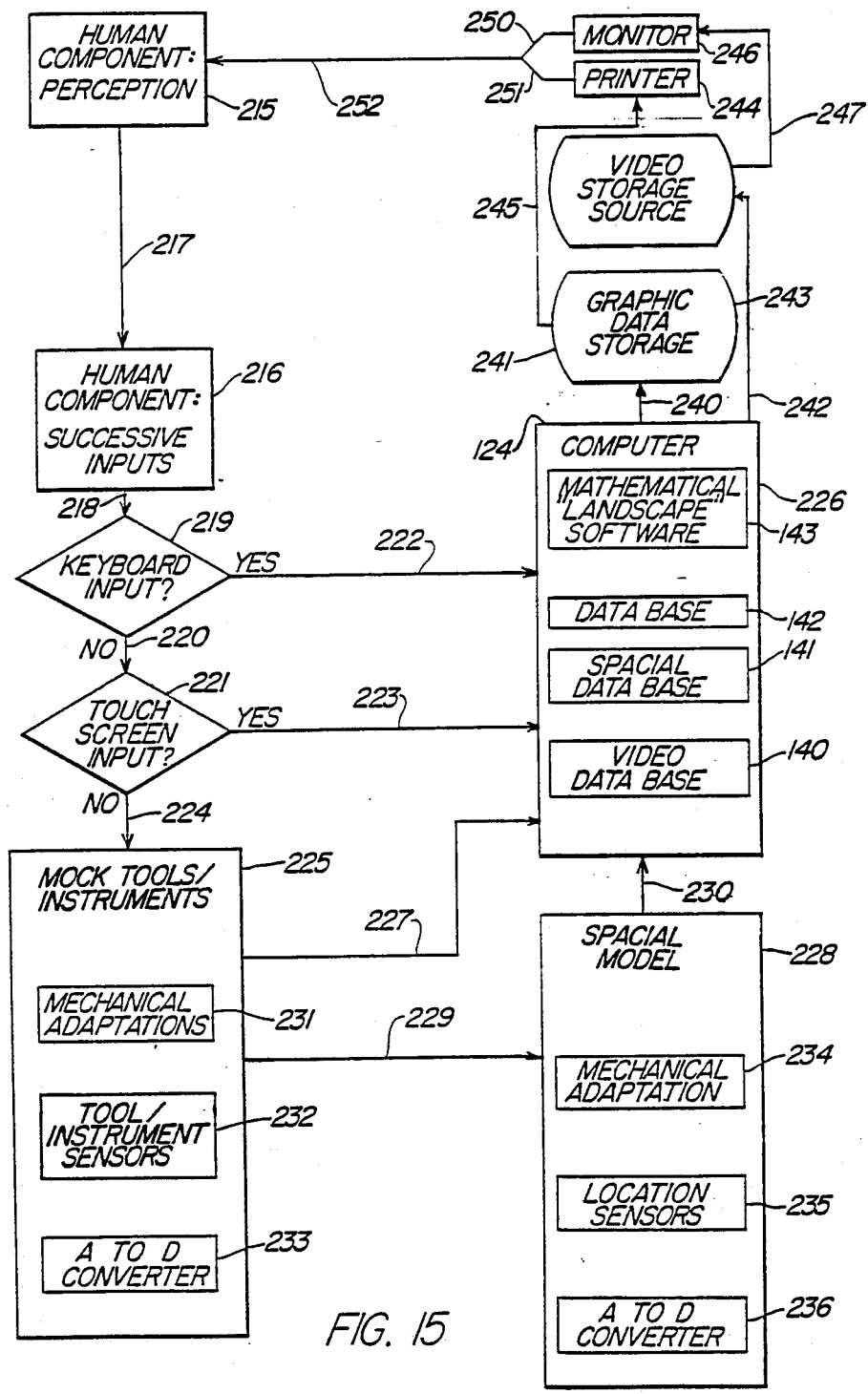

Now turning to FIG. 15, it will be observed that it depicts a logic and flow diagram following the general pattern of FIG. 13. However, while FIG. 13 portrays the flow of information for the operation of the scope during a typical investigative procedure reflecting the principles of the invention, FIG. 15 depicts the flow of information for the Frequency Picture Landscape according to the inventive concepts hereof. Here, the information flow begins with the human component of perception represented by "Human Component: Perception" rectangle 215. Interconnecting rectangle 215 with rectangle 216 "Human Component: Successive Inputs" is flow path 217 which represents human inputs into the system. As with FIG. 14, there are provisions for both keyboard and touch screen input which are represented by diamonds 219 and 221 "Keyboard Input?" and "Touch Screen Input?" that are connected with the "Human Component: Successive Inputs" 216 via path 218 and 220. Thus, if there is to be no keyboard input but the input is to be by touch screen, then the interaction is represented by both paths 218 and 220. On the other hand, if there is to be a keyboard input, then system operation includes the "Yes" path 222. If there is also to be touch screen input, "Yes" path 223 is included. If not, then the path of operation is characterized by path 224 that leads to "Mock Tools/Instruments" rectangle 225.

It will be thus observed that a keyboard input is communicated via path 222 to Computer 226 where the keyboard may access the data base and other functions of the computer as will hereinafter be described in more detail. If no, control extends via "No" path 220 to "Touch Screen Input?" 221. Again, if there is to be input by screen touch, system action is represented by path 223 which indicates connection to and access of Computer 226. If there is not to be input by keyboard or by touch screen input, then "Mock Tools/Instruments" module 225 is activated to communicate with computer 226 via path 227 and with "Spacial Model" module 228 via path 229. In such event, the desired system operation parameters are 269 and to Computer 226 over paths 227, 229, "Spacial Model" 228 and path 230. As the names suggest, the "Mock Tools/Instruments" module 225 and "Spacial Model" model 228 provide data and instructions needed by Computer 226 to simulate the conditions appropriate to the particular type of procedure desired by the operator.

Now turning again to Module 225, it will be observed to include "Mechanical Adaptations" Submodule 231, "Tool/Instrument Sensors" module 232 and an analogue to digital converter 233. The module 231 provides data for and control of the mechanical aspects of the mock apparatus as required for the particular type of procedure selected, module 232 provides data for and control of the tool and instrument sensors as described above, and the analogue to digital converter 233 provides the means of translation of analogue representations provided by modules 231 and 232 into digital form needed by computer 226 and, as necessary, for compatibility with spacial model 228.

Spacial model 228 includes submodule 234 which is similar to module 231 except that it pertains to the desired spacial model instead of mock tools and instruments. Location sensors module 235 provides information/instructions necessary to respond to and control the aforementioned sensors located within the mock representation, and the analog to digital converter provides for the needed interface between the analogue characteristics of modules 234 and 235 with mock tools-/instruments 225 and computer 226.

As may have been surmised, computer 226 of FIG. 15 is similar to computer 124 of FIG. 13 and it contains corresponding submodules which for simplicity of description will be indentified with like numbers, i.e., 140–143 inclusive. These submodules operate in a manner similar to that described in connection with FIG. 13 to which reference is made.

The output of computer 124/226 is represented by two paths: the first via channel 240 to "Graphic Data Storage" 241, and the other via path 242 to "Video Storage Source" 243. Thus, provision is made for both graphic data storage and video storage. The graphic data storage may be accessed by printer 244 via path 245; and the video storage source 243 may be accessed by the video monitor 246 by path 247. Again, as with the embodiment of FIG. 13, paths 250, 251 and 252 (corresponding to paths 150, 151 and 152 of FIG. 13) are shown to represent the feedback to the operator of printed data and visual representation presented by the monitor.

Figure 16:
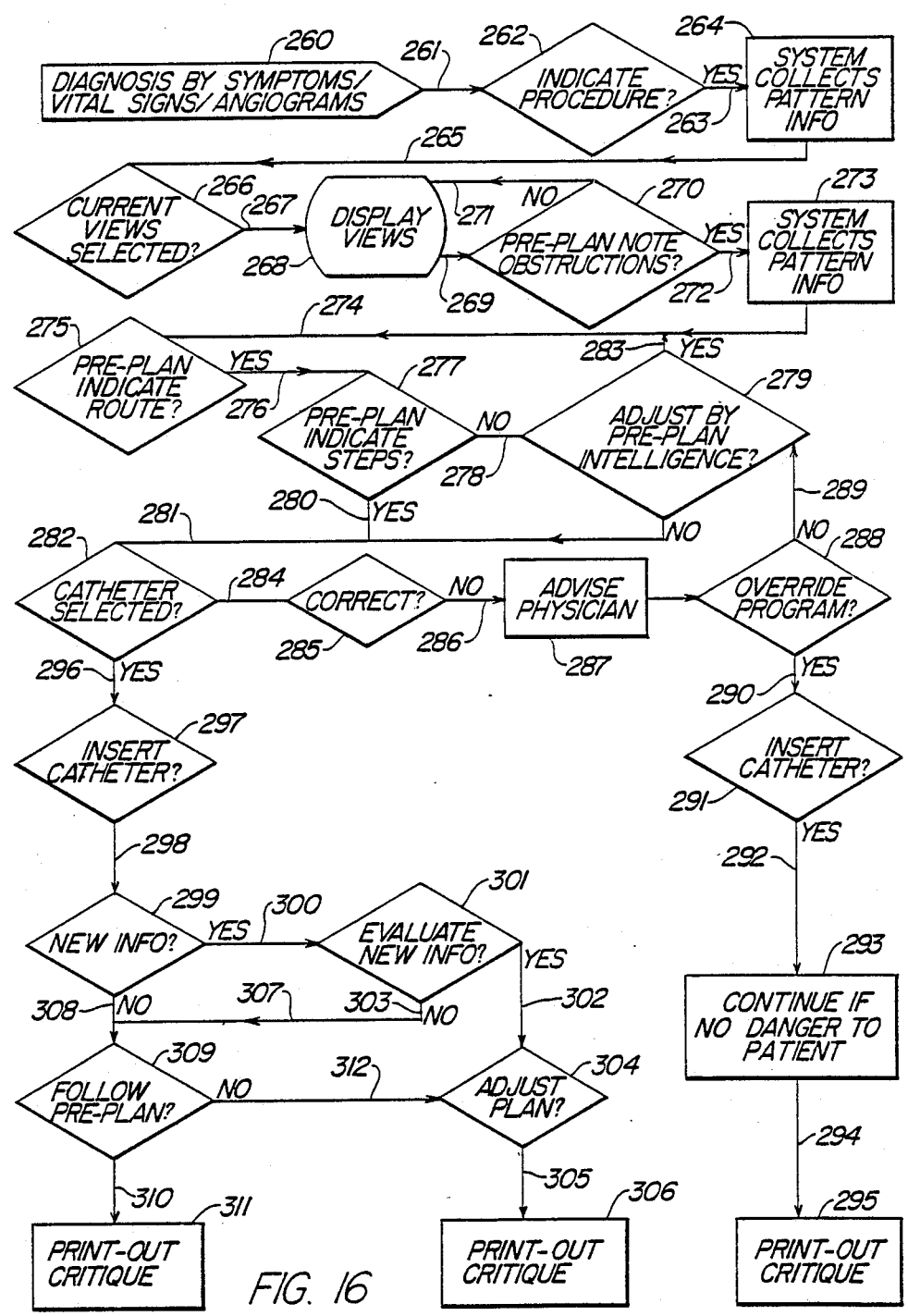

FIG. 16 is a logic/flow diagram portraying the flow of information in the frequency picture mode of system operation. Here, the flow begins with the diagnosis by symptoms, vital signs, and angiograms as indicated by block 260. The operator then identifies possible diagnoses and from them identifies the procedures that should be performed. This is represented by path 261 and diamond 262. If a procedure is to be performed, this is represented by "Yes" path 263 that leads to the next step represented by "System Collects Pattern Information" rectangle 264. Of course, if no procedure is indicated, the system is not activated.

Assuming that a procedure is indicated, then the system collects information from the aforementioned data storage and introduces into the active memory of, or couples into such active memory, the data needed to generate the selected mock simulation. This is contemplated by the "System Collects Pattern Info" rectangle 264. Thereafter, the system proceeds along path 265 to the "Current Views Selected?" diamond 266 which represents the system selecting the current views in response to the position of the investigative device (e.g., catheter) as sensed by the sensors, all as described above. Thereafter, communication is made via path 267, and such current views are displayed on the video monitor represented by "Display Views" block 268.

If desired, the "Pre-Plan Note Obstruction?" function may be activated as represented by path 269 pr diamond 270. In such event, the sensors are alerted to identify and note any obstructions and to highlight their existence. If not, then "No" path 271 is activated to condition display 268 so as to either be unresponsive to obstructions or to avoid highlighting them.

If the anwser to "Pre-Plan Note Obstructions?" is "Yes", then "Yes" path communicates with "System Collects Pattern Info" activity 273 so that the system collects the pattern information and stores it appropriately. Thereafter, the system accesses its operator input to determine via path 274 whether the answer to "Pre-Plan Indicate Route?" (diamond 275) is "Yes" or "No." If "Yes", system operation is represented by "Yes" path 276 which inputs "Pre-Plan Indicate Steps?" diamond 277. If the answer is "No", such answer is reflected by movement along "No" path 278 to "Adjust By Pre-Plan Intelligence?" diamond 279 where provision is made for adjustment. On the other hand, if the answer is "Yes", then progress of the system is represented by "Yes" path 280 which by-passes and leads on via path 281 to diamond 282.

If the answer in "Adjust By Pre-Plan Intelligence?" 279 is Yes, then system progress moves via "Yes" path 283 back to path 274 for re-introduction to "Pre-Plan Indicate Route" 275 so as to signify the need for such route indication.

When the system progresses to the state reflected by "Catheter Selected" 282, the system proceeds via path 284 to ask if this is correct as identified by "Correct" diamond 285. The operator is thus alerted to the condition. If the answer at "Correct" diamond 285 is "no", this response is communicated by "No" path 286 to an "Advise Physician" block 287 where a decision may optionally be made to override the program as indicated by "Override Program?" diamond 288.

If the decision is made not to override the program at block 288, then such decision is communicated via "No" path 289 back to block 279 so as to permit adjustment of the procedure as at pre-plan intelligence block 279. On the other hand, if the decision is made to override the program, such decision is communicated via "Yes" path 290 to "Insert Catheter?" diamond 291 where such question (i.e., insert catheter?) is injected into the system for presentation on the aforementioned system visual monitor (not shown in FIG. 16). If the decision is made by the operator to insert a catheter, then such decision is represented by system progress along "Yes" path 292 to block 293 which signifies continuation of the procedure provided there is no danger to the patient. From thence, an output is communicated via path 294 to "Print-out Critique" block to produce a print-out of a procedure critique which is prepared in the manner described above.

Now returning to "Catheter Selected?" diamond 282, it will be observed that if the answer is "Yes", then communication indicative of such answer is extended via "Yes" path 296 to "Insert Catheter?" diamond 297 at which point a visual direction is made on the video monitor to the operator that the system is ready for him to proceed with insertion. After insertion is accomplished, such information is communicated via path 298 to "New Info?" diamond 299. If new information is present, such is indicated by procedure via the "Yes" path 300 to "Evaluate New Info?" diamond 301 and thence via either the "Yes" path 302 or the "No" path 303. If on "Yes" path 302, the system proceeds to the "Adjust Plan?" state as represented by diamond 304 where provision is made for adjustment of the plan underlying the selected procedure. After such adjustment (if any), system operation proceeds along path 305 to the "Print-Out Critique" condition 306 which results in the printout of an appropriate critique as described above for previous critique printouts.

Returning to diamond 301, if the answer to the "Evaluate New Info?" question is negative, such answer results in the system pr along path "No" paths 307 and 308 to the input of "Follow Pre-Plan" diamond 309 where the system addresses the question of following the pre-plan. If the answer is "Yes", such answer results in the movement of system action along "Yes" path 310 to "Print-Out Critique" block 311 where, as with block 306, it brings about the printout of an appropriate critique as described above for previous critique printouts.

If, on the other hand, the answer at diamond 309 is "No", then the system operation proceeds along "No" path 312 to an input of "Adjust Plan" block 304 and thence, after any indicated plan adjustment, via path 305 to "Print-Out Critique" block 306.

Figure 17:
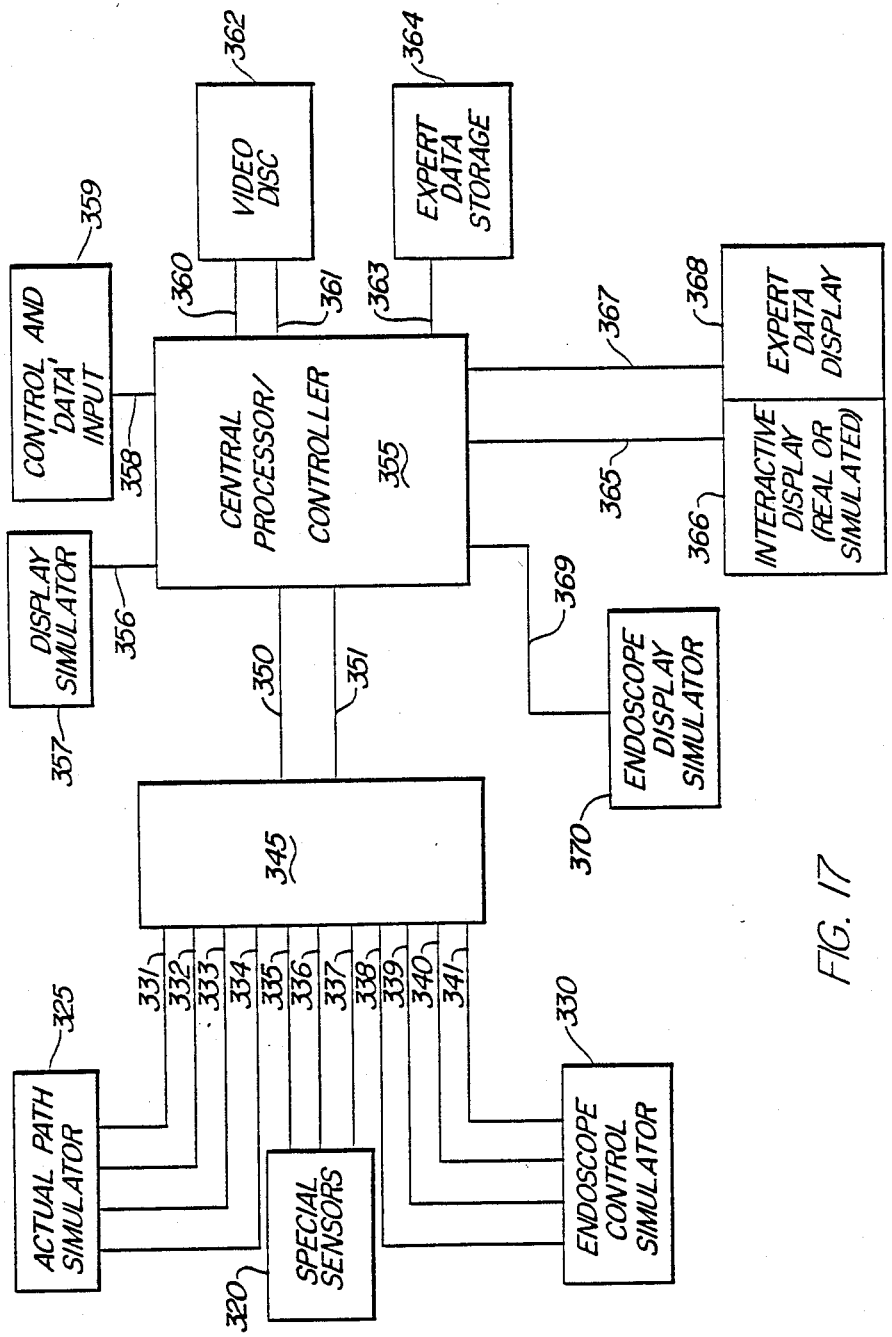
FIG. 17 is a block diagram showing the interrelationships of the principal components of the system according to the invention.

Reference is now made to FIG. 17 which portrays in block diagram form, some of the physical modules that make up the principal parts of the system. At the left side of the figure there are the inputs from the Physical Sensors 320, the Actual Path Simulator module 325 and the Endoscope Control Simulator 330. These all feed via the indicated paths 331–341 inclusive into the input module 345 where they are processed. After processing in accordance with the above-described figures, the processed information is communicated via paths 350 and 351 to the input circuits of Central Processor/Controller 355 where they are further processed in accordance with the above described operations. Also input connected to central processor/controller 355 are other circuits and modules: display simulators represented by rectangle 357 via pathway 356; control and data inputs represented by rectangle 359 via pathway 358; video display and disc represented by rectangle 362 via pathways 360 and 361; expert data storage represented by rectangle 364 via pathway 363; interactive display (real or simulated) represented by rectangle 366 via pathway 365; expert data display represented by rectangle 368 via pathway 367, and endoscope display simulator 370 via pathway 369. Each of these represents in physical form known processing or storage hardware items that are connected together in accordance with the inventive concepts hereof and which, under control of the program of the central processor/controller 355, function in the manner heretofore described.

It will now be evident that there has been described herein, an improved system that embodies a high degree of realism and operator interaction to provide highly realistic simulations of medical procedures, while providing a high degree of adaptability and versatility to meet the requirements of chosen procedures.

Although the invention hereof has been described by way of examples of preferred embodiments, it will be evident that other adaptations and modifications may be employed without departing from the spirit and scope thereof. For example, various combinations of operative procedures could be employed, provided that the principles herein described were maintained so as to provide a high degree of care in avoiding unwanted inconsistent interactions.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An investigative medical system comprising:
  (A) a physical model representing physically and spatially at least that portion of a patient on which a selected medical procedure is to be performed;
  (B) at least one implement representing a medical procedural tool normally employed in conducting said selected medical procedure;
  (C) moving means for moving and controlling said implement within said model;
  (D) first memory means for storing data representing the internal landscape of said at least that portion of said patient; and
  (E) means interconnected with said moving means and responsive to the position of said implement for producing and displaying a visual presentation of that portion of said internal landscape representing the region adjacent the active portion of said implement.

2. An investigative medical system according to claim 1 in which said physical model includes physical characteristics-imparting devices to impart realistic physical characteristics to said model.

3. An investigative medical system according to claim 1 in which said physical model includes a plurality of sensors located in predetermined positions within said model to track the position of said implement.

4. An investigative medical system according to claim 2 in which said physical model includes a plurality of sensors located in predetermined positions within said model to track the position of said implement.

5. An investigative medical system according to claim 2 in which said physical characteristics-imparting devices include constrictors.

6. An investigative medical system according to claim 4 in which said physical characteristics-imparting devices include constrictors.

7. An investigative medical system according to claim 2 in which said physical characteristics-imparting devices include spacers.

8. An investigative medical system according to claim 5 in which said physical characteristics-imparting devices include spacers.

9. An investigative medical system according to claim 6 in which said physical characteristics-imparting devices include spacers.

10. An investigative medical system according to claim 1 in which said tool is a catheter.

11. An investigative medical system according to claim 1 in which said tool is an endoscope.

12. An investigative medical system according to claim 4 in which said tool is an catheter.

13. An investigative medical system according to claim 4 in which said tool is an endoscope.

14. An investigative medical system according to claim 9 in which said tool is a catheter.

15. An investigative medical system according to claim 9 in which said tool is an endoscope.

16. An investigative medical system according to claim 9 in which said tool is a catheter and an endoscope.

17. An investigative medical system according to claim 1 in which said visual presentation is made on video-like screen.

18. An investigative medical system according to claim 17 in which said video-like screen is a conventional video monitor.

19. An investigative medical system according to claim 1 further including performance memory means for storing performance data representing a record of the performance of said medical procedure.

20. An investigative medical system according to claim 19 wherein said performance memory means comprises semiconductor storage means.

21. An investigative medical system according to claim 19 wherein said performance memory means comprises a magnetic disc.

22. An investigative medical system according to claim 19 wherein said performance memory means comprises a magnetic tape.

23. An investigative medical system according to claim 1 further including printing means effective, when activated, to print a record of predetermined data representing selected portions of said medical procedure.

24. An investigative medical system according to claim 1 further including idealized performance data storage means for storing idealized performance data representative of the idealized performance of said medical procedure.

25. An investigative medical system according to claim 24 further including means for accessing said idealized performance data and comparing said last mentioned data with data representing actual performance of said medical procedure to obtain comparison data.

26. An investigative medical system according to claim 25 further including translating means for translating said comparison data into perceptible data adapted for visual display.

27. An investigative medical system according to claim 26 further including comparison display means for displaying said perceptible data.

28. An investigative medical system according to claim 26 further including analysis means for analyzing said comparison data and for producing a critique display therefrom.

29. The method of performing a simulated medical procedure comprising the steps of:
(A) preparing a physical model representing physically and spatially at least the portion of a patient on which the procedure is to be performed;
(B) providing a first data storage means and storing data within first data storage means representing a realistic range of internal landscapes ordinarily encountered in patients for which predetermined medical procedures are ordinarily performed;
(C) identifying a pathology or diagnostic region set to be explored;
(D) inserting a medical procedural tool within said model;
(E) positioning said tool within said model and identifying the position of said tool within said model;
(F) accessing said first data storage means in response to the position of said tool within said model to retrieve selected data representing the one of said realistic internal landscapes represented by the position of said tool within said model;
(G) translating said selected data into visual form data; and
(H) displaying said visual form data in a visual display.

30. The method of performing a simulated medical procedure comprising the steps of:
(A) preparing a physical model representing physically and spatially at least that portion of a patient on which the procedure is to be performed;
(B) providing a first data storage means;
(C) storing data within first data storage means representing a realistic range of internal landscapes ordinarily encountered in patients for which predetermined medical procedures are ordinarily performed;
(D) identifying a pathology or diagnostic region set to be explored;
(E) selecting one of said predetermined medical procedures;
(F) inserting a medical procedural tool within said model;
(G) positioning said tool within said model;
(H) identifying and monitoring the position of said tool within said model;
(I) accessing said first data storage means in response to the position of said tool within said model to retrieve selected data representing the one of said realistic internal landscapes represented by the position of said tool within said model;
(J) translating said selected data into visual form data; and
(K) displaying said visual form data in a visual display.

31. A method according to claim 30 further including the step of printing said selected data.

32. A method according to claim 30 further including the step of positioning within said model a plurality of sensors for sensing the position of said tool.

33. A method according to claim 30 further including the step of positioning within said model a plurality of realism-imparting members for imparting to said model realistic feel to the positioning of said tool.

34. A method according to claim 30 further including the step of storing idealized data representing idealized performance of the selected one of said medical procedures.

35. A method according to claim 30 further including the step of collecting and storing performance data representative of the actual performance of the selected one of said procedures.

36. A method according to claim 34 further including the step of collecting and storing performance data representative of the actual performance of the selected one of said procedures.

37. A method according to claim 36 further including the step of comparing said performance data with said idealized data to produce comparison data.

38. A method according to claim 37 further including the step of translating said comparison data into visual form data.

39. A method according to claim 38 further including the step of displaying said visual form data.

40. A method according to claim 37 further including the step of printing said comparison data.

41. A method according to claim 35 wherein said step of storing performance data comprises the step of making a permanent record of said performance data.

42. A method according to claim 37 further including the step of analyzing said comparison data and producing a procedure critique.

* * * * *